Figure 1:
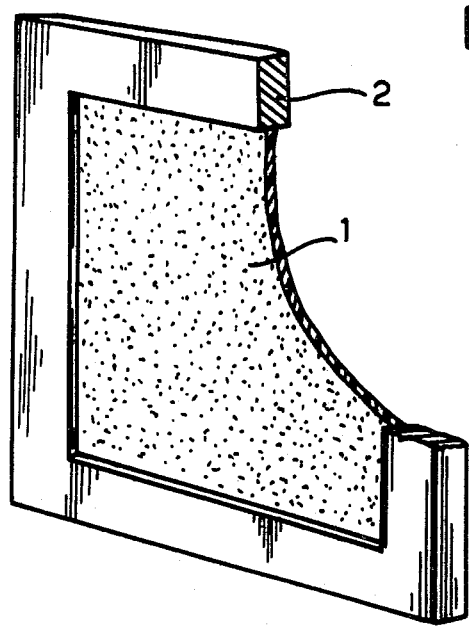

United States Patent [19]

Iemmi et al.

[11] 4,294,893

[45] Oct. 13, 1981

[54] GRAPHITE-RESIN COMPOSITE ELECTRODE STRUCTURE, AND A PROCESS FOR ITS MANUFACTURE

[75] Inventors: Giuliano Iemmi, Turin; Diego Macerata, Pinerolo, both of Italy

[73] Assignee: Centro Ricerche Fiat S.p.A., Orbassano, Italy

[21] Appl. No.: 41,050

[22] Filed: May 21, 1979

[51] Int. Cl.³ .................. H01M 4/96; H01M 4/62; C25B 11/12

[52] U.S. Cl. ..................... 429/42; 429/217; 204/290 R; 204/291; 204/294

[58] Field of Search ............ 204/294, 290 R, 291; 429/42, 44, 45, 217, 218

[56] References Cited

U.S. PATENT DOCUMENTS 3,385,780 5/1968 Feng ........................ 204/291 X
3,932,197 1/1976 Katz et al. ................. 204/294 X
4,086,155 4/1978 Jonville ..................... 204/290 R X

*Primary Examiner*—Donald R. Valentine
*Attorney, Agent, or Firm*—Sughrue, Mion, Zinn, Macpeak and Seas

[57] ABSTRACT

A composite graphite-resin porous electrode structure is made by intimately mixing powdered graphite with the resin monomers and partially polymerizing and grinding the mixture before forming a moulding composition by adding a pore-forming agent removable by decomposition or leaching to form uniformly-sized pores. A catalyst for the electrode reaction is incorporated in the electrode with the pore-forming agent or in a thin layer during moulding and an electrically-conductive strengthening element which acts as a rheophore is also incorporated during moulding. Layers having different pore sizes may be formed and a water-repellent film is applied to one face of the electrode.

2 Claims, 2 Drawing Figures

GRAPHITE-RESIN COMPOSITE ELECTRODE STRUCTURE, AND A PROCESS FOR ITS MANUFACTURE

The present invention relates to a graphite-resin composite electrode structure, and to a process for its manufacture.

The electrode of the invention is particularly, but not exclusively, applicable to use in fuel cells having acid electrolytes. Electrodes for such uses must be constructed in such a way as to allow contact between the reacting substances, the conductor for the electric current produced and any catalyst for the electrode reactions which may be present.

The most widely used structures consist of superimposed layers which are formed by various techniques (spraying, lamination, etc.) and include:

(a) porous compositions consisting of conducting carbons, catalysts and fluorinated polymer binders;
(b) a water-repellent membrane, consisting of fluorinated polymers;
(c) mechanical supports (sometimes functioning as an internal rheophore) comprising metallic materials or acid-resistant polymeric materials.

The layer in which the characteristic electrochemical reaction takes place is structure (a), which, by its very nature, is not self supporting, and therefore requires the addition of structure (c). The above electrode structures thus include inert masses which adversely affect the weight of the electrochemical cell as a whole and hence its specific performance (power/weight; energy/weight). In addition, they can only be formed by complex processes including numerous stages and high costs.

The object of the present invention is to provide an electrode structure which is simpler and cheaper to produce than that of electrodes currently available, requiring fewer production stages for its manufacture, and which may be made from readily available, acid-resistant materials.

According to one aspect of the present invention there is provided an electrode for electrochemical cells comprising a porous, graphite-resin composite structure incorporating a catalyst, one face of the structure being treated so as to render it water-repellent and the said one face and the opposite face each having pores of substantially uniform size.

In this specification by 'graphite' is meant graphite per se and also other forms of electrically-conductive carbon, such as acetylene black.

The water-repellent surface is intended to face the gas supply of a fuel cell, in use, so as to allow passage of the gas through the surface into the porous electrode while preventing the passage of the electrolytic solution, with which the said opposite face would be in contact, therethrough. Preferably the said one face has a water repellent substance, such as a fluorinated polymer, applied to it.

An electrode according to the invention may have pores of substantially uniform size throughout but in some embodiments the composite structure includes two layers forming the said faces, the pores of one layer being of a different size from the pores of the other layer. The provision of two layers allows the catalyst to be concentrated in one of the layers or in the zone of contact between them, although it may alternatively be concentrated in any other desired zone or distributed throughout the structure as convenient for the intended use of the electrode. The actual pore sizes, their distribution and the surface area of the electrode may also be varied according to the nature of the electolytic cell with which the electrode is to be used.

The composite structure preferably includes a strengthening element. This may be in the form of a compact, substantially non-porous zone which may also be electrically-conductive and arranged to act as a rheophore. Alternatively the strengthening element may comprise fibres of graphite or other acid-resistant material which are preferably interposed between two layers of the composite structure in the form of woven material or a mesh and which preferably also acts as a rheophore.

According to a further aspect of the invention there is provided a process for the manufacture of an electrode as described above, including the following stages:

mixing a prepolymer for the resin intimately with powdered graphite, and adding a removable pore-forming agent to form a moulding composition, moulding the composition to form the electrode, and forming the pores by removal of the pore-forming agent, and further including the introduction of the catalyst and treatment of one face of the electrode so as to render it water-repellent.

The advantage of the present process for the manufacture of electrodes over those used previously is that all the variations in the electrodes, such as the formation of pores of different sizes, introduction of or formation of strengthening elements, and addition of catalyst and other additives can all be achieved within the above three basic stages.

The first stage includes the mixing of the powdered graphite with the prepolymer, that is the polymer monomers, for the resin and is carried out by a method suitable for the chosen ingrendients. For example the prepolymer may comprise a mixture of monomers in liquid form, in a preferred embodiment the monomers being dissolved in a solvent, in which case the graphite would be dispersed in the liquid and the monomers would be partially polymerised to obtain a solid composition which would be ground to powder form before the addition of the pore-forming agent.

The pore-forming agent must be obtainable in powder form of a suitable grain size, preferably less than 100 microns and must be removable from the moulded electrode, for example, by decomposition, preferably at the temperature of cross-linking of the resin, or by leaching with a solvent, preferably water. The grain size and quantity of the pore-forming agent used, as of the graphite and resin, will depend on the intended use of the electrode, and hence on the desired characteristics of the electrode. For a fuel-cell electrode the composition should be within the following limits:

(a) polymer binder resin from 15–50% by weight
(b) conducting filler 50–85% by weight
(c) pore-forming agent 30–120% by apparent volume.

The partical size of components (a) and (b) is preferably less than 50 microns.

The stages of the process for the manufacture of an electrode according to the invention will now be described in greater detail.

Stage 1

(a) Preparation of the prepolymer-graphite mixture for a polymide resin-graphite structure The dianhydride and the diamine which will form the poly-imide are dissolved in a suitable solvent, for example methanol, and the required quantity of powdered graphite to give the desired relative proportions of the resin monomers and graphite after drying is added. The resin monomers are then partially polymerized at a temperature of approximately 220° C. to 280° C. for 10 to 20 minutes, and the solvent is evaporated.

(b) The resulting solid is ground to the desired particle size and intimately mixed with the pore-forming agent and possibly with finely-divided, solid catalyst.

The above stage is carried out with simple equipment but such as to obtain a homogeneous distribution of the various components in the mass since a non-homogeneous distribution, for example, of the pore-forming agent would result in discontinuity of the porosity in the final electrode with serious detriment to its electrochemical performance.

Stage 2

The composition from Stage 1 is moulded to the desired form by hot-pressing (in the case of a poly imide resin at 300° C.) with a pressure greater than 200 Kg/cm$^2$; the forming of the electrode is followed by annealing at a temperature lower than that of cross-linking of the resin (250° C.).

Stage 3

(a) Heat-decomposable pore-forming agent

If the pore-forming agent added in Stage 1 (b) is heat-decomposable, the formation of the porosity takes place simultaneously with Stage 2. In this case complex moulds which allow the discharge of gases resulting from the decomposition of the pore-forming agent must be used for forming the electrode but the operating conditions are substantially as above. The temperature of decomposition of the pore-forming agent is preferably close to that of cross-linking of the resin.

(b) Leachable pore-forming agent

Leaching is effected after the moulding stage with a solvent suitable for the chosen pore-forming agent. For example:

(a) metals such as copper, aluminium, zinc, iron, nickel or their oxides may be leached with mineral acids or alkalis.

(b) inorganic substances such as anhydrous sodium sulphate may be leached with water.

(c) organic polymers may be leached with organic solvents.

Water-soluble pore-forming agents are preferred. Leaching may be carried out in a flow of solvent or in a static bath with frequent renewal of the solvent.

Catalyst

The catalyst chosen depends on the desired nature of the electrode reaction but for electrodes of hydrogen-air fuel cells with an acidic electrolyte the catalyst is usually a nobel metal, such as platinum or palladium, or tungsten carbide, or mixtures of these in varying proportions.

Although the catalyst may be added in Stage 1, as described above, to obtain a uniform distribution through an electrode it may alternatively be added during Stage 2 of the process of preparation. In the latter case, the powdered catalyst may be distributed in the mould by appropriate techniques to obtain a thin layer of the catalyst in the resulting electrode, thus achieving a high concentration of catalyst at the site of the electrode reaction, in use.

As a further alternative, the addition of the catalyst may be effected after Stage 3, by absorption of the catalyst from solution. For example platinum may be absorbed from solution in the form of chloroplatinic acid which is subsequently chemically reduced in situ to give the free metal.

Strengthening and/or electrically conductive elements

Strengthening and/or electrically conductive elements may be incorporated in the electrode structure during Stage 2. These may comprise fibres, preferably formed into a mesh or woven material, which are suitably disposed in the mould during filling with the electrode composition. Alternatively a non-porous, electrically-conductive strengthening zone may be formed in or around the porous structure.

Hydrophobic layer

In use in a fuel cell, the hydrophobic or water-repellent layer prevents the passage of liquid electrolyte through the electrode in one direction, while allowing the passage of the gas in the opposite direction. The layer preferably consists of a thin film of sintered, porous polytetrafluoroethylene (P.T.F.E.) which is applied to a surface of the composite electrode structure by any one of the following techniques:

(a) Spraying a suspension of P.T.F.E. and a surface-active agent in water on to one surface of the electrode after Stage 3

(b) Dispersion of a thin layer of P.T.F.E. in the mould before the moulding in Stage 2

After application of the P.T.F.E. by either of the above methods, the electrode is heated to sinter the P.T.F.E. to ensure its optimum adhesion to the base material and the optimum degree of water-repellence.

Figure 2:
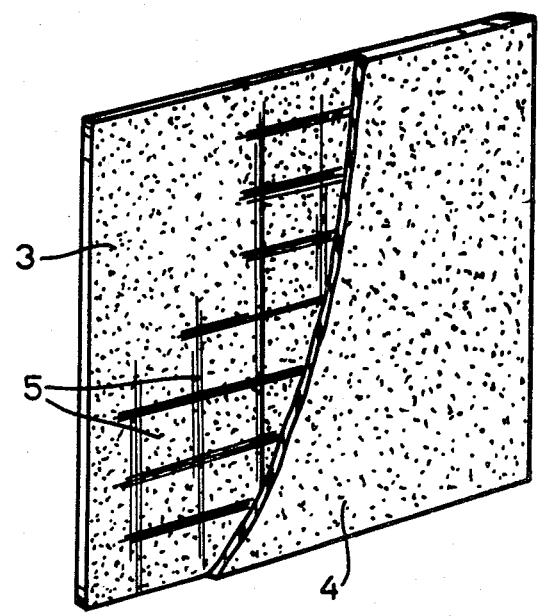

Two electrodes according to the invention will now be more particularly described, by way of example, with reference to the accompanying drawings, in which:

FIGS. 1 and 2 are partially cut-away perspective views of respective embodiments of the invention.

Referring to FIG. 1 of the drawings, an electrode is shown comprising a composite structure including a plate 1 surrounded by a strengthening frame 2. The plate 1 is of a porous material comprising graphite particles bonded together by a heat-stable poly-imide resin and including a finely divided catalyst, the pores being of substantially uniform size and the pores and particulate material being substantially uniformly distributed through the plate.

The frame 2 is of a compact, non-porous graphite-resin material which has good electrical conductivity and also serves as a rheophore for the electrode.

One face of the plate 1 is treated with a water-repellent poly-tetrafluoroethylene.

Referring to FIG. 2 of the drawings, a hydrogen electrode for a fuel cell is shown comprising a composite structure having two layers 3 and 4 each of a porous material formed from graphite particles bonded together by a heat-stable poly-imide resin, the layer 3 also including a finely divided platinum catalyst. Each of the layers 3 and 4 has pores of substantially uniform size with the pores and the particulate matter substantially uniformly distributed; but the size of the pores in the two layers differ from each other; the pores in layer 3 have diameters of less than 33 microns whereas the pores in layer 4 have diameters of between 44 microns and 88 microns.

Between the layers 3 and 4 is interposed a mesh 5 of graphite fibres which act as a strengthening element and as a rheophore for the electrode.

One face of the electrode has a water-repellent film of poly tetrafluoroethylene applied to it.

The electrode of FIG. 2 is made by the following process. The process for the manufacture of the oxygen electrode for the fuel cell is entirely similar, except for the introduction of the appropriate catalyst for the oxygen reaction.

Stage 1

The binder-resin monomers 4, 4'-carbonyl-dipthalic anhydride and 5-norbornane-2,3-dicarboxyl anhydride are dissolved in methyl alcohol in a 1:1 ratio with a stoichiometrically equivalent quantity of diaminodiphenylmethane. Graphite, in fine powder form, is then added so as to obtain a dense, homogenous suspension containing 70% by weight of graphite and 30% by weight of the binder-resin monomers.

The heating of the suspension is carried out in two stages, that is, a first stage in which it is heated at 150° C. until the methyl alcohol has evaporated completely, and a second stage in which it is heated at 250° C. to effect partial cross-linking of the poly-imide resin around the graphite particles The resulting composition is ground in a ball mill to obtain a powder having a particle size of a few microns and is then mixed with sodium sulphate (pore-forming agent) and with tungsten carbide (catalyst) to form two different mixtures, as follows:

(Mixture a)

1 g of graphite-resin mixture;
0.5 g of sodium sulphate having a particle size less than 33 microns;
1.18 g of tungsten carbide (catalyst) with a high specific surface area;

(Mixture b)

1.5 g of graphite-resin mixture;
2 g of sodium sulphate having a particle size of between 44 and 88 microns.

The pore-forming agent is formed by grinding the sodium sulphate and sieving it through A.S.T.M. 170, 325, 450 sieves so as to obtain two fractions: first consisting of particles having a size of less than 33 microns and a second consisting of particles having diameters of between 44 and 88 microns.

The quantities indicated are suitable for the manufacture of an electrode with a surface area of 27 cm$^2$, and a thickness of approximately 1.1 mm.

Stage 2: Moulding

This stage is effected with a stamping mould of N.C.D. 4 steel, provided with a heating ring. The mixture (a) is placed in the mould first in a uniform layer followed by the graphite mesh and the mixture (b) which is superimposed in a further, even layer.

The mould is then heated and put under pressure with the following operating conditions:
pressure of the plates: 500 Kg/cm$^2$
temperature: 300° C.
moulding time: 60 minutes When the moulding has been completed the electrode obtained is extracted from the mould and annealed at 250° C. to complete the cross-linking of any remaining monomers in the resin.

Stage 3: Formation of the pores

The pore-forming agent (sodium sulphate) is eliminated from the electrode by prolonged boiling in water. Frequent changing of the washing water reduces the time needed for complete elimination of the pore-forming agent.

On average the treatment takes approximately two hours but it is advisable, after this length of time, to take a sample from the last washing water and subject it to qualitative analysis to ascertain whether any sulphate remains. If the result is negative the treatment may be stopped whereas if the result is positive, that is sulphate is still present, the treatment should be continued until further tests are negative.

What is claimed is:
1. A press-formed fuel cell electrode comprising an electrically conductive porous plate portion contoured by an electrically conductive compact carrier frame portion integral with said plate portion, the structure of each of said portions being formed by resin-bonded particles of a conductive carbon, the bonding resin being a cross-linked polyimide resin in an amount of 15–50% while the carbon particles are correspondingly in an amount of 85–50% on the joint weight of the carbon particles and resin, and wherein the porous plate portion has been obtained by a process comprising pressing at cross-linking temperature a particulate mixture of (a) particles of a prepolymer of said polyimide resin filled with said carbon particles and (ii) particles of a pore-forming agent removable by volatilization or leaching, one face of the porous plate portion being coated with sintered particles of polytetrafluoroethylene rendering said face hydrophobic.

2. The electrode of claim 1, wherein the polyimide resin is the reaction product of 4,4'-carbonyl diphthalic anhydride and 5-norbornane-2,3-dicarboxyl anhydride in 1:1 molar ratio with stoichiometrically equivalent amount of diamino-diphenyl-methane.

* * * * *